United States Patent [19]
Min

[11] Patent Number: 5,170,248
[45] Date of Patent: Dec. 8, 1992

[54] MOTION-ADAPTIVE VERTICAL CONTOUR COMPENSATOR IN TELEVISION SET

[75] Inventor: Byung-Min Min, Seoul, Rep. of Korea

[73] Assignee: Samsung Electronics Co., Ltd., Suwon, Rep. of Korea

[21] Appl. No.: 555,018

[22] Filed: Jul. 20, 1990

[30] Foreign Application Priority Data

Jul. 20, 1989 [KR] Rep. of Korea .................. 89-10286

[51] Int. Cl.$^5$ ............................................ H04N 11/20
[52] U.S. Cl. ........................................ 358/37; 358/46; 358/31; 358/105
[58] Field of Search ............... 358/31, 105, 11, 140, 358/37, 166, 96

[56] References Cited

U.S. PATENT DOCUMENTS

| | | | |
|---|---|---|---|
| 4,530,004 | 7/1985 | Achiha et al. | 358/11 |
| 4,608,594 | 8/1986 | Nicholson | 358/105 |
| 4,612,567 | 9/1986 | Pritchard | 358/11 |
| 4,672,445 | 6/1987 | Casey et al. | 358/11 |
| 4,677,461 | 6/1987 | Mizutani et al. | 358/96 |
| 4,677,483 | 6/1987 | Dischert et al. | 358/140 |
| 4,731,648 | 3/1988 | Bernard et al. | 358/140 |
| 4,882,625 | 11/1989 | Akiyama | 358/140 |
| 4,912,556 | 3/1990 | Hirauchi et al. | 358/96 |
| 4,933,758 | 6/1990 | Saito et al. | 358/96 |
| 4,987,489 | 1/1991 | Hurley et al. | 358/11 |
| 4,989,090 | 1/1991 | Campbell et al. | 358/11 |
| 5,016,103 | 5/1991 | Rabii | 358/37 |
| 5,043,811 | 8/1991 | Yasuhiro | 358/11 |

FOREIGN PATENT DOCUMENTS 0055791 4/1985 Japan .
0195791 8/1989 Japan .

Primary Examiner—James J. Groody
Assistant Examiner—Jeffrey S. Murrell
Attorney, Agent, or Firm—Robert E. Bushnell

[57] ABSTRACT

A motion-adaptive vertical contour compensator having a receiver for an ID (Improved Definition) system, a color signal processing stage, a motion-detector, a matrix and a vertical contour compensating circuit, wherein the vertical contour compensating circuit is connected between the motion detector and the matrix for performing the compensation after detecting correlation between still and motion pictures of an image, being controlled by the motion-detector. By using the embodiments disclosed, an image of high definition can be obtained since a corresponding extra value to an operating state of the image is added after a double-conversion of a scanning line interpolated signal and an original signal.

16 Claims, 3 Drawing Sheets

MOTION-ADAPTIVE VERTICAL CONTOUR COMPENSATOR IN TELEVISION SET

BACKGROUND OF THE INVENTION

The present invention relates to a vertical contour compensator in a television set, and more particularly to a motion-adaptive vertical contour compensator which compensates the vertical contour by adding an extra value corresponding to a motion state of an image after a double-conversion of a scanning line interpolated signal and an original signal.

As necessity of good images with the higher definition, ID (Improved Definition) systems in which a vertical scanning ratio was improved from 2 : 1 to 1 : 1 in conventional televisions such as NTSC, SECAM and PAL systems, ED (Extended Definition) systems in which a cancel function of a ghost image is added to a transmitter and a receiver, and HD (High Definition) systems in which the high definition is achieved by using a satellite broadcasting system have been under development.

Particularly, in a television of the ID system which is compatible with the conventional TV broadcasting system and obtains the image of high definition, the vertical contour compensation is carried out after the vertical scanning lines are doubled by an interpolation of motion-adaptive scanning lines.

In the conventional ID-TV, the contour compensation is performed as shown in FIG. 1. In FIG. 1, a luminance signal Y is separated by a Y/C separator 2 according to an output of a motion-detector 3 after converting an analog composite video signal into a digital signal by an A/D converter 1. A Y-processor 4 controls the contrast of the Y-signal and compensates horizontal and vertical contours of the Y-signal so that the luminance signal separated by the Y/C separator 2 and a Y-interpolator 5 interpolates the luminance. This Y-signal is doubled by a double-converter 7 so that a clock frequency is doubled. Then, the Y-signal is applied to a matrix 12 to provide R, G, and B (Red, Green, and Blue) signals after a digital-to-analog conversion of the Y signal by a D/A converter 9.

Similarly, a color signal C is processed through a C-processor 15, a C-interpolator 6, a double-converter 8, D/A converters 10 and 11, and the matrix 12. During the above process, necessary clock and control signals are provided from a synchronous-separator 13 and a control signal generator 14, respectively.

The conventional vertical contour compensation is carried out by the Y-processor 4 and the frequency characteristic of this case is shown in FIG. 2(a). This frequency characteristic reveals no correlation between the scanning lines at a screen of 0, 525/2 CPH (Cycles Per Height) in the vertical direction. Therefore, in a totally black (or all white) or periodically white-and-black screen, the scanning lines have no correlation to each other as shown in FIG. 2(b). In a screen of 525/4 CPH, the correlation reaches a maximum value B as shown in FIG. 2(b) (vertical detail).

Since the conventional vertical contour compensation has frequency characteristic as shown in FIG. 2(a), in case of scanning lines of 525/2 CPH in the periodical black-and-white screen, vertical contour compensation is impossible. In other words, the vertical contour compensation can not be expected in a screen which has an edge component along with the vertical direction.

SUMMARY OF THE INVENTION

The present invention has an object to provide a circuit which compensates the vertical contour by adding an extra value corresponding to operating state of an image after double-conversion from a scanning line interpolated signal to the original signal, thereby to obtain higher definition.

According to the present invention, there is provided a receiver for ID (Improved Definition) systems including a luminance processing stage for processing a luminance signal separated from an image signal after an analog-to-digital conversion of a composite image signal; a color signal processing stage for processing a color signal separated from the image signal; a motion-detector connected to the luminance signal processing stage for controlling a Y-interpolator for a contour compensation according to an operating stage of image; a matrix for an arithmetic processing of double-converted luminance and color signals; and a vertical contour compensating circuit connected between the motion-detector and the matrix for performing the contour compensation after detecting correlation between still and motion picturers of an image, being controlled by the motion-detector.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE INVENTION

The present invention will be now described in more detail with reference to the accompanying drawings.

Figure 3:
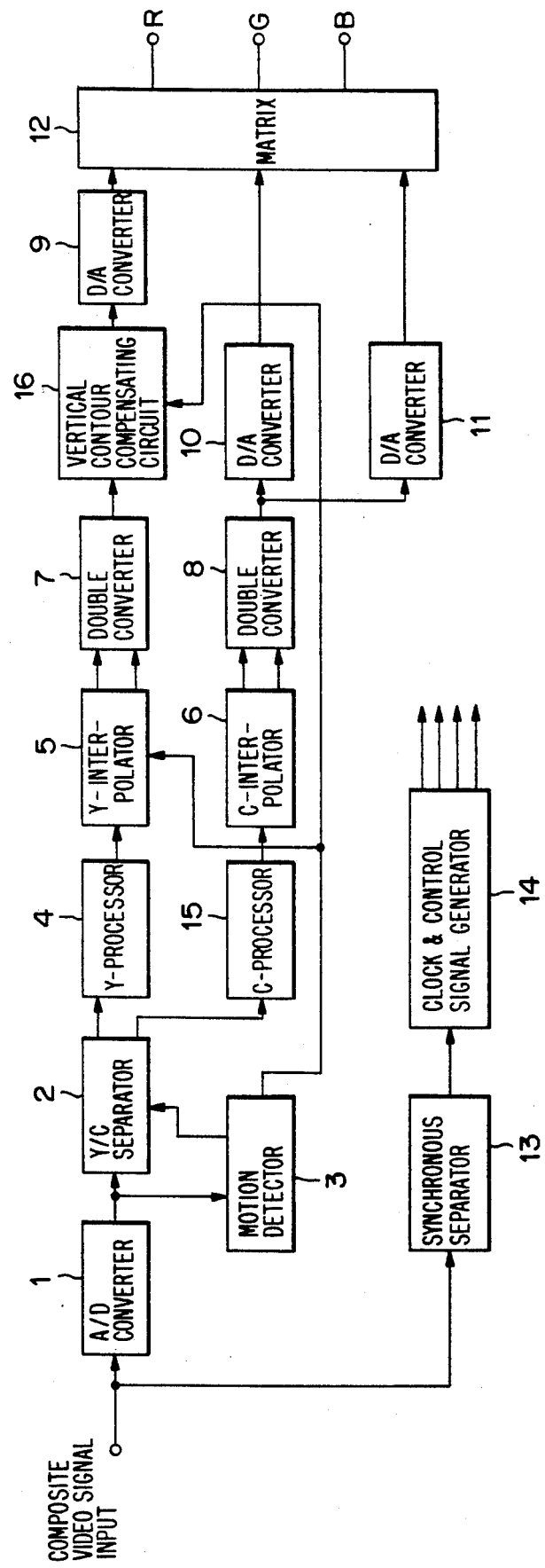
FIG. 3 is a block diagram of a whole receiver of one embodiment according to the principles of the present inventions.

FIG. 3 shows a schematic circuit diagram of the receiver of an embodiment according to the present invention. In FIG. 3, an analog-to-digital converter (i.e., an A/D converter) 1 converts an analog composite image signal to a digital image signal and provides the digital image signal to both of a luminance/chrominance separator (i.e., a Y/C separator) 2 and a motion-detector 3. The motion-detector 3 includes memory devices and comparators and the Y/C separator 2 includes a band pass filter. The motion-detector 3 makes a comparison of image of a previous field with that of a present field and provides a motion detecting signal as a result of the comparison.

A luminance signal Y and a color signal C separated by the Y/C separator 2 are applied to a Y-processor 4 and a C-processor 15, respectively. The Y-processor 4 carries out the compensation of the contrast and contour. The contour compensation provides the contour compensating signal including a delayed original signal and a contour signal which is obtained by removing the noise from a signal through a predetermined frequency band for the contour compensation.

A Y-interpolator 5 carries out the motion-adaptive interpolation by receiving the motion detecting signal of the motion-detector 3. A motion-adaptive interpolation is carried out in such a manner that an interfield interpolation is carried out in case of a still image, while an intrafield interpolation is carried out in the case of an operating image. Thus, when the motion detecting signal is not applied to the Y-interpolator 5 and the data changes as little as the still image, the interpolating signal is provided a half of the combined image signals of the previous and present fields so as to increase the horizontal scanning lines.

On the other hand, when the motion detecting signal is applied to the Y-interpolator 5 and the data changes as much as the operating image, a simple interpolation is carried out by doubling the intrafield scanning lines. Therefore, if the motion-adaptive interpolation is carried out, the number of the horizontal scanning lines is doubled and then a horizontal scanning frequency f should be increased from 15 KHz up to 31 KHz, so a double-converter 7 will be applied to double the horizontal scanning frequency.

The color signal C separated by the Y/C separator 2 is provided to the C-processor 15 to be demodulated. Subsequently, the demodulated color signal is provided to a C-interpolator 6 so as to be doubled by the simple interpolation with a double-converter 8 and applied to both D/A converters 10 and 11.

The D/A converter 10 converts a R-Y (Red-Yellow) digital signal to a corresponding analog one and the other D/A converter 11 converts a B-Y (Blue-Yellow) digital signal to a corresponding analog one. The digital-to-analog converted signals are provided to the matrix 12, and a G-Y (Green-Yellow) signal is obtained through an arithmetic process of the R-Y and B-Y signals. Also, a digital luminance signal through the double-converter 7 is converted to a corresponding analog one by a D/A converter 9 and provided to the matrix 12. The matrix 12 generates image signals of R, G, and B through the arithmetic process of the luminance and color signals.

A synchronous-separator 13 separates a synchronous signal from the composite video signal and provides it to a clock and control signal generator 14. Outputs of the clock and control signal generator 14 ar adapted to drive each circuit described hereinabove.

Figure 1:
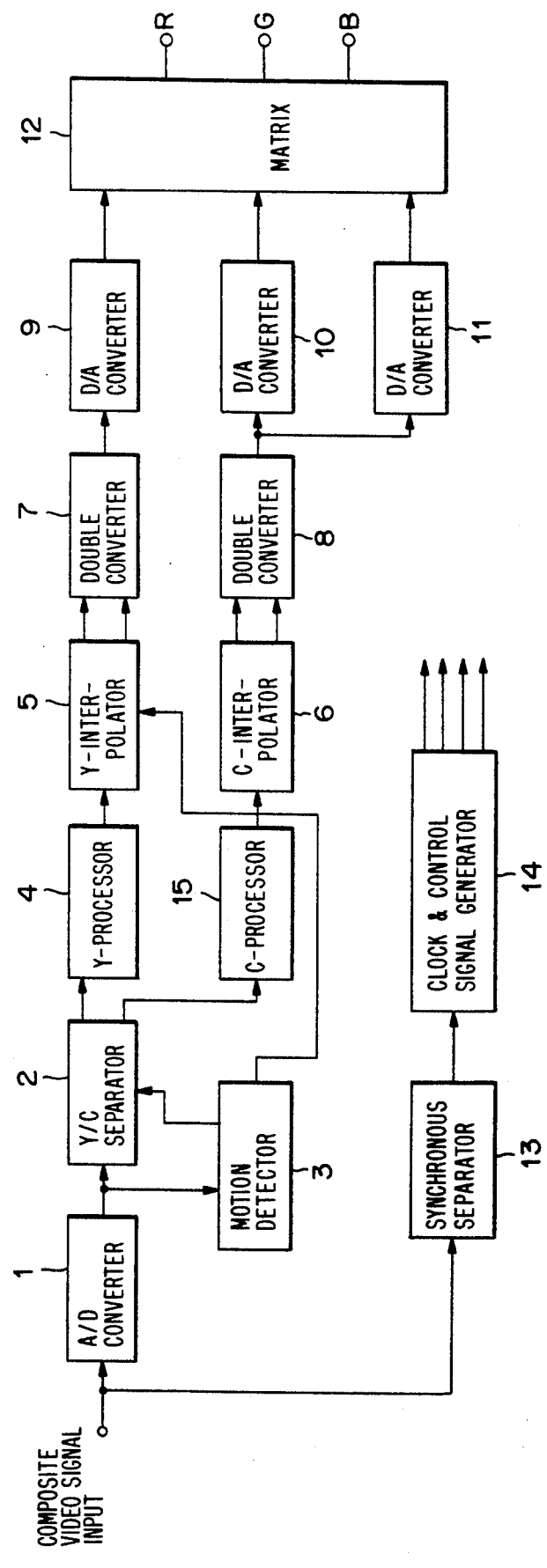
FIG. 1 is a block diagram of a receiver of a conventional ID (Improved Definition) system.
Figure 2A:
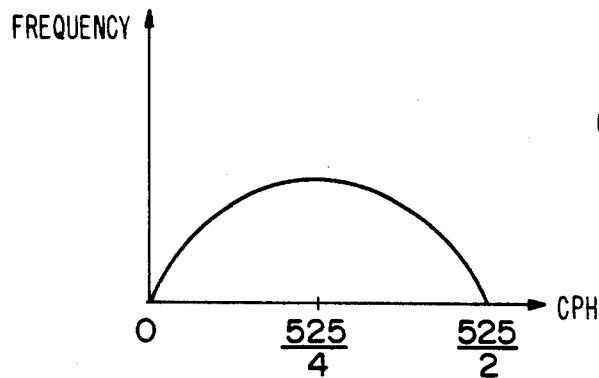
FIGS. 2a and 2b show motion frequency characteristics of a luminance processor (Y-processor) in FIG. 1.
Figure 2B:
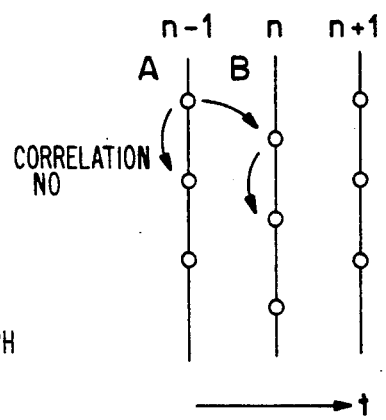
Figure 5A:
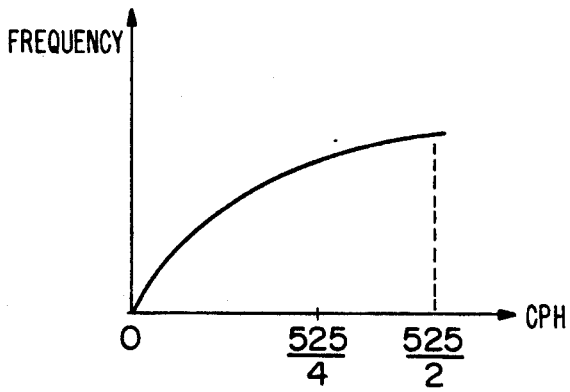
FIGS. 5a and 5b show motion frequency characteristics of a motion detector illustrated in FIG. 3 according to the principles of the present inventions.

This basic operation is similar to that of the receiver of the ID system as shown in FIG. 1. The major difference of the present invention in FIG. 3 in view of the receiver of the ID system is that a vertical contour compensator 16 to be operated by the motion-detector 3 is connected between the double-converter 7 and the D/A converter 9 to carry out the motion-adaptive contour compensation. According to the contour compensation in this manner, the frequency characteristic can be improved as is shown in FIG. 5(a) from that of FIG. 2(a).

Figure 4:
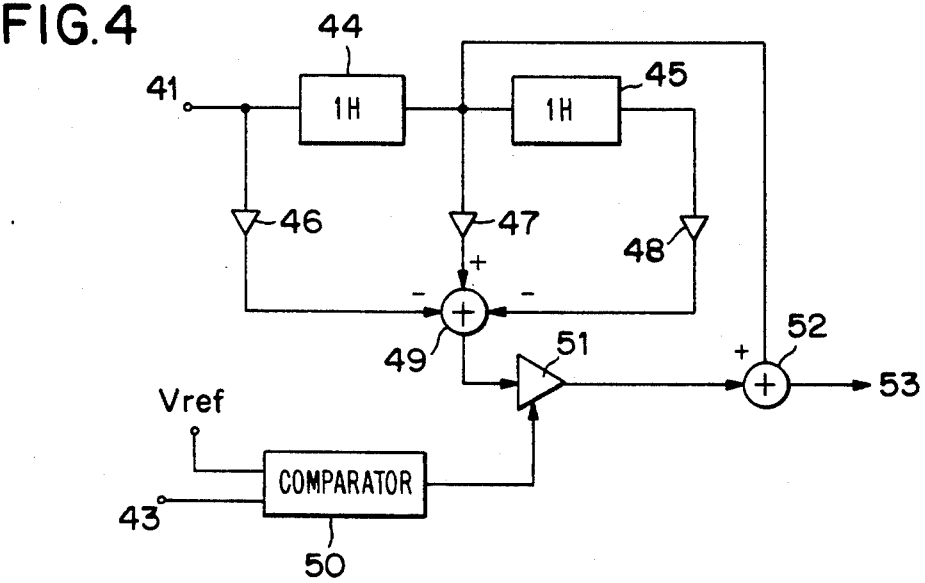
FIG. 4 is a detailed diagram of a vertical contour compensating circuit illustrated in FIG. 3 according to the principles of the present inventions.

FIG. 4 is a detailed circuit of the vertical contour compensator 16 in the embodiment according to the present invention. A first 1H-delay part 44 and a first pre-scaler 46 are connected to an output node of the double-converter 7. A second 1H-delay part 45 is connected to the first 1H-delay part 44, and a second pre-scaler 47 and a third pre-scaler 48 are connected to each output node of the first and second 1H-delay parts 44 and 45, respectively.

The outputs of the first, second, and third pre-scalers, 46, 47, and 48 are connected to a first adder 49 in which the outputs of the first and third pre-scalar 46 and 48 are subtracted, while the output of the second pre-scalar 47 is added. The gain of the pre-scalars is $\frac{1}{2}$.

Furthermore, one input node of a comparator 50 is connected to an output node of the motion-detector 3 and the other input node of comparator 50 is connected to a reference voltage terminal, to be applied with a predetermined reference value $V_{ref}$, so that a motion rate counter 51 connected to the rear of comparator 50 is controlled by the operating state of the image.

The motion rate counter 51 is connected to the first adder 49 to add an output value of the first adder 49. A second adder 52 is connected to the output node of the motion-counter 51 and in which outputs of the motion-detector 51 and the first 1H-delay part 44 are added to provide a contour compensating signal.

In this invention, when an output signal of the double-converter 7 is applied through a line 41, this signal is 2H combfiltered by the first and second 1H-delay parts 44 and 45 and the correlation between the scanning lines along the vertical direction is distinguished by the first, second, and third pre-scalers 46, 47, and 48 and thus the vertical detail signal is obtained.

The vertical detail signal component is added to the 1H-delayed original signal through the first adder 49, motion rate counter 51, and the second adder 52, but if it is added without any conditions, this component deteriorates the quality of the image in case of a much operating picture. Therefore, if it is determined that there is frequent motion in a picture, the vertical contour compensation is not proper.

The operating signal of the motion-detector 3 as shown in FIG. 3 is provided to comparator 50 through a line 43 to be compared with the reference voltage data provided through the line 42, in which a reference for the distinction between the still and motion pictures of the image selected by a designer. If the result of the comparison in the comparator 50 is near to the still image, the extra value is added to the vertical detail signal, whereas the motion rate counter 51 provides a number close to zero not to carry out vertical compensation in the opposite case.

Thus, for much of the operating image comparator 50 turns off motion rate counter 51 and the contour compensating signal is not provided so that the second adder 52 provides only the original image signal, but for the still image, comparator 50 drives motion-rate 51 and the contour compensating signal is provided through motion-rate counter 51 so that the second adder 52 provides a combined original signal with the contour compensating signal applied through the first adder 49.

Figure 5B:
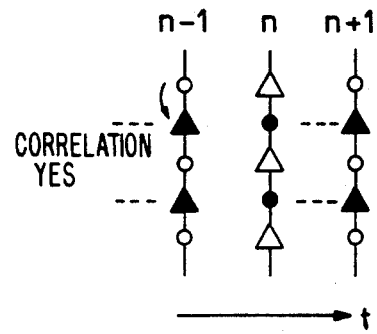

FIG. 5(a) shows the frequency characteristic of the vertical contour compensator as described hereinabove in which the correlation is the highest at 525/2 CPH since a sampling frequency considering the correlation is twice higher than the conventional one. Furthermore, the correlation between the neighboring scanning lines is the maximum in the periodical black-and-white screen as shown in FIG. 5(a), since one field has 525 scanning lines due to the scanning line interpolated signal as shown in FIG. 5(b).

Thus, this invention can carry out the vertical contour compensation sufficiently. The present invention which compensates the vertical contour by adding the extra value corresponding to the operating state of the image can be adaptable to IDTV, EDTV, et cetera, and can obtain an image of high definition since the extra value is added according to the operating state of the image after the double-conversion of the scanning line interpolated signal and the original signal.

The inventions disclosed are in no way limited to the embodiments described hereinabove. Various modifications of the disclosed embodiments as well as other embodiments of the invention will become apparent to persons skilled in the art upon reference to the description of the invention. It is therefore contemplated that the appended claims will cover any such modifications or embodiments as fall within the true scope of the inventions.

What is claimed is:

1. A motion-adaptive vertical contour compensator, comprising:
   luminance processor means for processing a luminance signal separated from an image signal;
   chrominance processor means for processing a chrominance signal separated from said image signal;
   interpolator means for interpolating said luminance signal;
   double converter means coupled to said interpolator means for doubling the frequency of said luminance signal;
   motion-detector means coupled to receive said image signal, for providing a motion indicative signal to control said interpolator means;
   matrix means for processing said luminance and chrominance signals; and
   vertical contour compensator means interposed between said double converter means and said matrix means, for performing vertical contour compensation to said luminance signal in response to said motion indicative signal, said vertical contour compensator means comprises:
      detector means for detecting a difference value between the scanning lines in a vertical direction to provide a vertical detail signal, said detector means comprising first and second 1H-delay means;
      plural pre-scalar means coupled to receive the output of said first and second 1H-delay means for scaling the frequency to a predetermined level;
      first adder means for adding and/or subtracting the outputs of said plural pre-scalars means;
      control means for controlling said vertical detail signal; and
      second adder means for adding an output of said control means and an output of said first 1H-delay means of said detector means for performing vertical contour compensation.

2. The motion-adaptive vertical contour compensator according to claim 1, wherein said control means comprises:
   comparator means for comparing said motion indicative signal with a reference voltage to provide a first control signal; and
   motion-counter means coupled to receive said first control signal and said vertical detail signal, for generating a second control signal representative of a vertical contour compensating signal in dependence upon reception of said first control signal and said vertical detail signal.

3. The motion-adaptive vertical contour compensator according to claim 1, wherein an amplitude is increased parabolically when the motion frequency to be provided to the vertical contour compensator means is 525/2 cycles per height rather than 525/4 cycles per height.

4. In a motion-adaptive vertical contour compensator having a luminance processor for performing a first vertical contour compensation of luminance signals to provide a first vertical compensated signal, a luminance interpolator for receiving a motion indicative signal and said first vertical compensated signal to provide an interpolated signal, a motion detector for providing said motion indicative signal, a double scan line converter for receiving said interpolated signal to provide a scan line signal in dependence upon reception of said interpolated signal, wherein the improvement comprises a vertical contour compensating circuit coupled to receive said scan line signal for performing a second vertical contour compensation of said scan line signal in response to said motion indicative signal.

5. The motion-adaptive vertical contour compensator according to claim 4, wherein said vertical contour compensating circuit comprises:
   detector means for delaying said scan line signal by 1H to provide a first delayed signal, and for detecting a difference value of said scan line signal in a vertical direction to provide a vertical detail signal;
   control means for controlling said vertical detail signal in response to said motion indicative signal; and
   compensator means for vertical contour compensating by adding an output of said control means to said first delayed signal.

6. The motion-adaptive vertical contour compensator according to claim 5, wherein said detector means comprises:
   first delay means for delaying the scan line signal by 1H;
   second delay means for delaying an output of said first delay means by 1H;
   a first pre-scalar for amplifying the scan line signal with a predetermined amplification factor;
   a second pre-scalar for amplifying an output of the first delay means with a predetermined amplification factor;
   a third pre-scalar for amplifying an output of the second delay means with a predetermined amplification factor; and
   means for subtracting an output of the second pre-scalar to the output of the first and third pre-scalar.

7. The motion-adaptive vertical contour compensator according to claim 6, wherein each of said first, second and third pre-scalars has a half-amplification factor.

8. The motion-adaptive vertical contour compensator according to claim 5, wherein said control means comprises:
   comparator means for providing a value indicative of the difference between the motion indicative signal and a predetermined reference voltage after comparing said motion indicative signal with said predetermined reference voltage; and
   multiplier counter means for multiplying said vertical detail signal with said value indicative of the difference between said motion indicative signal and said reference voltage to provide a signal representative of a vertical contour compensating signal.

9. The motion-adaptive vertical contour compensator according to claim 5, wherein said compensator means comprises an adder.

10. A television receiver apparatus having a motion-adaptive vertical contour compensator, comprising:
input means for receiving a video signal;
motion detector means responsive to said video signal for producing a motion indicative signal;
separator means for separating said video signal into a luminance signal and a chrominance signal in response to said motion indicative signal;
means for processing said chrominance signal to provide a processed chrominance signal;
interpolator means for interpolating said luminance signal in response to said motion indicative signal to provide an interpolated luminance signal;
converter means for receiving said interpolated luminance signal to speed up a scanning line frequency of said intepolated luminance signal to provide a converted luminance signal;
vertical contour compensator means for receiving said converted luminance signal for performing vertical contour compensation of said converted luminance signal in response to said motion indicative signal to provide a vertical compensated signal; and
matrix means for receiving said said vertical compensated signal and said processed chrominance signal to generate color signals.

11. The television receiver apparatus according to claim 10, wherein said vertical contour compensator means comprises:
detector means for delaying said converted luminance signal by 1H to provide a first delayed signal, and for detecting a difference value between scanning lines along a vertical direction of said converted luminance signal to generate a vertical detail signal;
control means for controlling said vertical detail signal in response to said motion indicative signal to provide a first control signal representative of a vertical contour compensating signal; and
compensator means for receiving said first control signal and said first delayed signal to provide a second control signal representative of said vertical compensated signal.

12. The television receiver apparatus according to claim 11, wherein said detector means comprises:
first delay means for receiving the converted luminance signal for delaying said converted luminance signal by 1H to provide the first delayed signal;
second delay means for delaying said first delayed signal by 1H to provide a second delayed signal;
first pre-scalar means for amplifying said converted luminance signal by a predetermined amplification factor to provide a first amplified signal;
second pre-scalar means for amplifying said first delayed signal by said predetermined amplification factor to provide a second amplified signal;
third pre-scalar means for amplifying said second delayed signal by said predetermined amplification factor to provide a third amplified signal; and
means for subtracting said first amplified signal and said third amplified form said second amplified signal to generate the vertical detail signal.

13. The motion-adaptive vertical contour compensator according to claim 11, wherein said control means comprises:
comparator means for comparing said motion indicative signal to a reference voltage to provide a motion signal representative of one of a stationary picture and a non-stationary picture; and
motion rate counter means for receiving the vertical detail signal and said motion signal to provide the first control signal representative of said vertical contour compensating signal.

14. The motion-adaptive vertical contour compensator according to claim 11, wherein said compensator means is an adder.

15. The motion-adaptive vertical contour compensator according to claim 12, wherein each of said first, second and third pre-scalars means has a half-amplification factor.

16. The motion-adaptive vertical contour compensator according to claim 10, wherein an amplitude of the converted luminance signal is increased parabolically when the scanning line frequency to be provided to the vertical contour compensator means is 525/2 cycles per height rather than 525/4 cycles per height.

* * * * *

UNITED STATES PATENT AND TRADEMARK OFFICE
CERTIFICATE OF CORRECTION

PATENT NO. : 5,170,248
DATED : December 8, 1992
INVENTOR(S) : Byong-Min Min

It is certified that error appears in the above-indentified patent and that said Letters Patent is hereby corrected as shown below:

On the Title page, item [75] inventor: change "Byung-Min Min" to-- Byong-Min Min--.

Signed and Sealed this

Ninth Day of November, 1993

*Attest:*

BRUCE LEHMAN

*Attesting Officer*   *Commissioner of Patents and Trademarks*